United States Patent [19]

Campbell et al.

[11] Patent Number: 4,840,774
[45] Date of Patent: Jun. 20, 1989

[54] PROCESS FOR THE PRODUCTION OF ZIRCONIUM TETRACHLORIDE FROM DISSOCIATED ZIRCON

[75] Inventors: John S. Campbell, Gerrards Cross; Brian N. Baker, Pinner; Anil Katyal, London, all of England

[73] Assignee: Tam Ceramics Inc., Niagara Falls, N.Y.

[21] Appl. No.: 68,803

[22] Filed: Jun. 26, 1987

Related U.S. Application Data

[63] Continuation of Ser. No. 759,113, Jul. 25, 1985, abandoned.

[30] Foreign Application Priority Data

Aug. 1, 1984 [GB] United Kingdom ................ 8419596

[51] Int. Cl.⁴ .............................................. C01G 25/04
[52] U.S. Cl. ........................................ 423/79; 423/69; 423/75; 423/76
[58] Field of Search .................... 423/69, 75, 79, 76

[56] References Cited

U.S. PATENT DOCUMENTS

| | | | |
|---|---|---|---|
| 2,204,454 | 6/1940 | Teichmann et al. | 423/79 |
| 2,940,826 | 6/1960 | Andersen | 423/79 |
| 3,293,005 | 12/1966 | McCord | 23/351 |
| 3,749,763 | 7/1973 | Scammon, Jr. et al. | 423/608 |
| 3,811,907 | 5/1974 | Scammon et al. | 106/299 |

FOREIGN PATENT DOCUMENTS

| | | | |
|---|---|---|---|
| 7701826 | 10/1978 | Brazil | 423/79 |
| 614652 | 2/1961 | Canada | 423/79 |
| 450053 | 7/1936 | United Kingdom | 423/69 |
| 709882 | 6/1954 | United Kingdom | 423/79 |
| 536549 | 10/1931 | Fed. Rep. of Germany | 423/79 |

OTHER PUBLICATIONS

Blumenthal, Warren, B., "The Chemical Behavior of ZIRCONIUM", D. Van Nostrand Company, Inc., pp. 216-218.

Primary Examiner—Robert L. Stoll
Assistant Examiner—Paige C. Harvey
Attorney, Agent, or Firm—Kenyon & Kenyon

[57] ABSTRACT

A process for the production of zirconium tetrachloride from dissociated zircon in which gaseous chlorine is passed through pellets consisting of ground dissociated zircon, carbon and a binder at a temperature in the range of from 450° to 800° C. The zirconium tetrachloride produced contains less than about 0.22% by weight, calculated as $SiO_2$, of silicon tetrachloride.

11 Claims, 1 Drawing Sheet

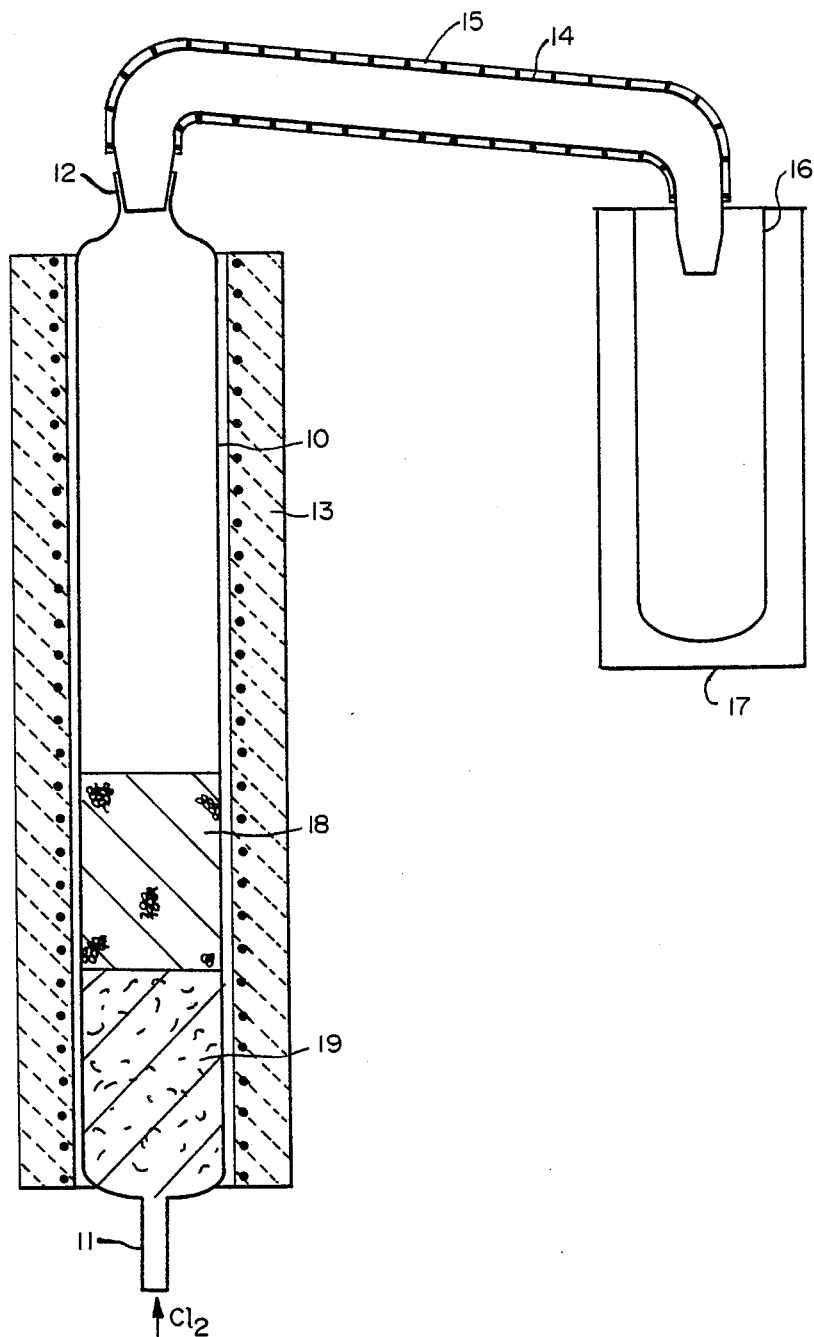

PROCESS FOR THE PRODUCTION OF ZIRCONIUM TETRACHLORIDE FROM DISSOCIATED ZIRCON

This application is a continuation of application Ser. No. 759,113, filed July 25, 1985, now abandoned.

It is well known that zircon, when melted by heating to a high temperature, e.g. in an arc, resistance or plasma furnace, dissociates into zirconia and silica, the heated material normally being quenched to inhibit recombination of the zirconia and the silica. Particularly in the case of heating in an arc furnace some of the silica is lost as vapour.

Zirconia has a higher melting point than silica and, upon rapid cooling of the melt, the zirconia separates as small particles encapsulated in a matrix of vitreous silica.

An existing procedure for effecting separation of the constituents of dissociated zircon is by treatment with caustic soda with a view to dissolving out the silica. This, however, yields zirconia with a content of silica considerably in excess of the maximum of 0.1% by weight of silica required for certain industrial uses.

The present invention provides a process for extracting zirconia from dissociated zircon, which consists in reacting pellets of ground dissociated zircon, carbon and a binder with gaseous chlorine at elevated temperature to produce zirconium tetrachloride which is substantially free of silicon tetrachloride.

When undissociated zircon is reacted in a pelletised form with carbon at elevated temperature with chlorine gas, the product consists of a mixture of zirconium tetrachloride and silicon tetrachloride in proportions corresponding to those of the zirconia and silica in the undissociated zircon. Separation of the silicon tetrachloride from the mixture is difficult to achieve.

We assumed when we contemplated chlorinating dissociated zircon that the same result would be obtained, and were surprised to discover that the silica content failed to react. The explanation is probably that after dissociation the crystal structure of the contained silica has been changed, possibly to an amorphous form, that is more difficult to chlorinate.

The reaction is preferably carried out at a temperature in the range of 450°–800° C. Below 450° C. the rate of reaction is unduly slow and above 800° C. there is a tendency for the silica to react with the chlorine to form silicon tetrachloride.

In carrying out the process according to the invention some silica may carry over, as such, with the product zirconium tetrachloride, this tendency depending on the rate of flow of chlorine through the reaction zone. Separation of this silica from the zirconium tetrachloride presents no difficulty. The product can be condensed as a solid, from which pure zirconium tetrachloride can be recovered by sublimation, or in water to form a solution from which the silica may be separated by filtration.

The pure zirconium tetrachloride is readily convertible into zirconia or other zirconium compounds by known methods.

The presence of carbon in the pellets is essential because in the absence of carbon no reaction occurs.

We believe that the reaction takes place in accordance with one or other of the following equations, with the second predominating:

$$ZrO_2 + SiO_2 + C + 2Cl_2 \rightarrow ZrCl_4 + SiO_2 + CO_2 \quad (1)$$

$$ZrO_2 + SiO_2 + 2C + 2Cl_2 \rightarrow ZrCl_4 + SiO_2 + 2CO \quad (2)$$

The ratio by weight of zircon to carbon for equation (1) is 15:1 and for equation (2) is 7.6:1, these ratios representing the minimum amount of carbon required. Experimental evidence suggests that more carbon than the stoichiometric amounts assists the complete utilisation of the chlorine. We prefer that the ratio by weight of zircon and carbon in the pellets should be 2:1 to 6:1.

The dissociated zircon should be ground sufficiently finely to free the zirconia particles from the surrounding vitreous silica to ensure that all the zirconia is available for reaction with chlorine, and to this end the ground material should pass a 100 mesh sieve, this corresponding to a maximum particle size of 150 microns.

A typical particle size distribution, as determined by a sedimentation method, of such a ground product is:

| | | |
|---|---|---|
| 80% | below | 38 microns |
| 60% | below | 35 microns |
| 40% | below | 15 microns |
| 20% | below | 7 microns |
| 10% | below | 3 microns |

The nature of the carbon used in the pellets is not critical but it should be ground to the same size as the zircon. Preferably the ash content of the carbon should not exceed 10% by weight and preferred forms of carbon are wood charcoal and ground petroleum coke. It is also desirable to avoid a high volatile content in the carbon since otherwise emission of volatile compounds during the reaction tends to break up the pellets and increase the carry over of silica.

The pellets should not be unduly large, because unduly large pellets result in reduction of the rate of reaction. Preferably the size of the pellets does not exceed 15 mm diameter.

The binder must, of course, be able to hold the pellets together at the reaction temperature. Examples of suitable binders are sodium silicate, polyvinyl acetate and china clay. Excessive binder content reduces the rate of the reaction. Preferably the binder should be used in an amount not greatly exceeding that required to hold the pellets together, e.g. 0.8–6% by the weight of the pelleted mixture. A low volatile content in the binder is desirable.

BRIEF DESCRIPTION OF THE DRAWING

The following Examples, with the exception of Example 1 which is a comparative Example, are illustrative of the invention. In Examples 1–3, use was made of the apparatus shown in the accompanying diagrammatic drawing.

This included a silica glass reactor 10, having an internal diameter of 40 mm and a length of 300 mm, with a bottom inlet 11 for chlorine gas and an upper outlet 12. The reactor 10 was surrounded by an electric resistance furnace 13. The outlet 12 was joined to a tube 14, surrounded by heating tape 15 at a temperature of 350°–380° C., which conducted the reaction product to a condenser 16 for zirconium tetrachloride disposed in a vacuum flask 17 containing liquid nitrogen.

The reactor 10 contained a bed 18 of pellets, having a depth of 50–80 mm, supported on a packing 19, of depth 70 mm, of aluminium silicate fibres. This packing served to support the pellets and also to diffuse the chlorine gas entering at the inlet 11. The pellets used in Examples 1-3 had a zircon to carbon ratio of 3.8:1 by weight and the chlorine flow rate was 500 cm³/min.

The apparatus used in Examples 4-8 was very similar, except that the reactor had an internal diameter of 70 mm and a length of 250 mm and the zirconium tetrachloride was condensed as solid particles, as the gases leaving the reactor were cooled by admixture with secondary air, and was collected in a laboratory baghouse. The depth of the column of pellets was 120-150 mm and of the packing 50 mm.

EXAMPLE 1

Unground dissociated zircon having a particle size of approximately 1 mm was pelletised with carbon and binder into pellets of the composition given above of about ¼" diameter and chlorinated at 920° C. in the apparatus shown in the drawing. The rate of chlorination was very slow, 0.25 g chlorinated per minute.

EXAMPLE 2

Zircon dissociated in an arc furnace and ground to give an average particle size of 10 μm had the following analysis in proportions by weight:

| | |
|---|---|
| $ZrO_2 + HfO_2$ | 70% |
| $SiO_2$ | 29.2% |
| $Al_2O_3$ | 0.37% |
| CaO | 0.01% |
| $Fe_2O_3$ | 0.06% |
| $TiO_2$ | 0.19% |

The ground product was pelletised with carbon and a binder as before, and chlorinated at 750° C. to give a reaction rate of 1.56 g/min. The zirconium tetrachloride produced contained 0.22% of silica($SiO_2$).

EXAMPLE 3

A second sample of dissociated zircon ground in a laboratory mill to a final particle size range of less than 1.0 μm to 5 μm reacted at a rate of 1.3 g/min at 500° C. The condensed zirconium tetrachloride contained 0.5% silica.

The pellets used in the above examples were made using wood charcoal 25 parts, dissociated zircon 75 parts, and black molasses as binder at the rate of 5-10 ccs/100 grms powder. The weight of charge was about 150 grms of pellets in each case.

The dissociated zircon used in the next three examples was drawn from an industrially ground batch having the following particle size distribution:

| Stokes diameter μm | % wt undersize |
|---|---|
| 100 | 100 |
| 50 | 90 |
| 30 | 60 |
| 20 | 50 |
| 10 | 30 |
| 8 | 23 |
| 6 | 18 |
| 4 | 13 |
| 2 | 7 |
| 1 | 3 |

EXAMPLE 4

797 g of spherical pellets of diameter 5-6 mm and made from dissociated zircon, carbon and sodium silicate as binder were charged into the modified apparatus described above. The ratio by weight of dissociated zircon to carbon was 4:1, and the sodium silicate content approximately 0.8%. The source of the carbon was wood charcoal with a specific surface area of 61-2m²/g.

Chlorine was passed upwards through the column at 600 cm³/min after raising the temperature of the bed to 600° C. The duration of the run was 200 minutes. The residue was homogenised and analysed and it was found that 60% of the zircon in the dissociated zircon had reacted. The chlorine usage was 100%, based on a comparison of the amount used with the amount of zirconia found to have reacted.

EXAMPLE 5

748 g of pellets as described in Example 4 were heated to 600° C. in the same reactor. In this run the chlorine flow rate was increased to 750 cm³/min. The duration of the run was 200 minutes. The chlorine usage was 100%, and analysis showed that 80% of the zirconia in the dissociated zircon had reacted.

EXAMPLE 6

800 g of pellets of the composition stated in Example 4, but with a wider distribution of pellet sizes (5 to 15 mm) were chlorinated at 600° C. at a chlorine flow rate of 750 cm³/min. A further addition of 210 g of pellets was made during the course of chlorination, which lasted 195 minutes. The chlorine was turned off and the reactor and contents allowed to cool. They were reheated next day and a further addition of 241 g of pellets made. The chlorine flow rate was varied between 600 and 750 cm³/min for a further 105 minutes. Overall the chlorine usage was 93%, and 92% of the contained zirconia had reacted.

The products of Examples 4, 5 and 6 were collected, as stated, in a laboratory baghouse. Anaylses of spot samples drawn at two different times during each run are stated in Table 1. Samples were drawn from the bulked product of Examples 4 and 5 and dissolved in water. Insolubles were determined by filtration and weighing and silica re-determined on the filtrate. The soluble silica, attributed to the presence of a trace of silicon tetrachloride in the product was lower than total silica and below 0.1%. The higher, and variable, spot-sample values are attributed to carry-over of powder from the bed of pellets.

TABLE 1

| Example | % Total Silica in Product | % Insolubles in Water | % Soluble Silica |
|---|---|---|---|
| 4 | 0.26:0.09 | 1.5 | 0.070 |
| 5 | 0.53:0.54 | 1.4 | 0.053 |
| 6 | 0.07:0.54 | 1.4 | — |

EXAMPLE 7

1000 g of pellets within the range of diameters 5 to 15 mm and having a weight ratio of dissociated zircon to carbon of 6.6:1 were charged to the reactor described in Example 4. The ground dissociated zircon and carbon were from the same sources as those used in Examples 4 to 6. The temperature was raised to 725° C. Chlorine was passed at 800 cm³/min for 40 minutes, and at 500 cm³/min for a further 10 minutes. The chlorine was turned off and the reactor cooled. The reactor and contents were heated next day to 610° C. and chlorinated for a further 105 minutes at a chlorine flow rate of 500 cm³/min. Overall the chlorine usage was 80%, and 80% of zirconia charged to the reactor had reacted. The total silica content of the product was 0.92% and the soluble silica 0.102%.

EXAMPLE 8

(This Example illustrates the use of petroleum coke instead of wood charcoal as the source of carbon).

810 g of pellets within the range of diameters 5 to 15 mm were made from the ground dissociated zircon used in Examples 4 to 7, but with a weight ratio of dissociated zircon to carbon of 4:1. The binder as before was sodium silicate (0.8% by weight). The carbon used was a powdered petroleum coke having a specific surface area of 2.1 m$^2$/g. The pellets were loaded into the reactor described in Example 4 and chlorinated for 80 minutes at a chlorine flow rate of 600 cm$^3$/min, with the furnace controlled at 600° C. Completeness of reaction was checked by analysing the exit gases for unreacted chlorine. None was detected.

Zircon inevitably contains a small proportion of hafnium silicate and the zirconium tetrachloride produced by the process according to the invention accordingly contains a corresponding proportion of hafnium tetrachloride. The presence of this small amount of hafnium in the product, and in zirconium compounds derived from it, is not objectionable since the chemical properties of zirconium and hafnium and of their compounds are so similar as to be virtually indistinguishable.

We claim:

1. A process for the production of zirconium tetrachloride from dissociated zircon produced by melting zircon in a furnace to form a matrix of vitreous silica containing encapsulated zirconia, which process consists essentially of passing gaseous chlorine through pellets consisting of ground dissociated zircon, carbon and a binder at a temperature in the range of from 450° to 800° C. to produce a gaseous reaction mixture containing zirconium tetrachloride which contains less than about 0.22% by weight, calculated as SiO$_2$, of silicon tetrachloride, and recovering the zirconium tetrachloride therefrom.

2. Process according to claim 1 wherein the ratio by weight of dissociated zircon to carbon in the pellets is in the range of from 2:1 to 6:1.

3. Process according to claim 1 wherein the ground dissociated zircon has a maximum particle size of 150 microns.

4. Process according to claim 3 wherein the ground dissociated zircon has an average particle size of 10 microns.

5. Process according to claim 1 wherein the size of the pellets does not exceed 15 mm diameter.

6. Process according to claim 1 wherein the carbon used in the pellets is selected from the ground consisting of wood charcoal or ground petroleum coke.

7. Process according to claim 1 wherein the chlorination reaction is carried out at a temperature of about 600° C.

8. Process according to claim 1 wherein the zirconium tetrachloride produced in the reaction is condensed.

9. Process according to claim 1 wherein the zirconium tetrachloride is collected as a solution in water.

10. Process according to claim 1 wherein the zirconium tetrachloride is subsequently treated in order to produce zirconia containing less than about 0.22% by weight of silica.

11. Process according to claim 1 wherein the reaction mixture containing zirconium tetrachloride contains less than about 0.1% by weight, calculated as SiO$_2$, of silicon tetrachloride.

* * * * *